US009046051B2

(12) United States Patent
Narayanaswamy et al.

(10) Patent No.: US 9,046,051 B2
(45) Date of Patent: Jun. 2, 2015

(54) METHOD FOR OPERATING A SPARK-IGNITION, DIRECT-INJECTION INTERNAL COMBUSTION ENGINE

(75) Inventors: Kushal Narayanaswamy, Sterling Heights, MI (US); Calvin K. Koch, Bloomfield Hills, MI (US); Paul M. Najt, Bloomfield Hills, MI (US); Gerald A. Szekely, Jr., Sterling Heights, MI (US); Joel G. Toner, Bad Axe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1028 days.

(21) Appl. No.: 13/156,655

(22) Filed: Jun. 9, 2011

(65) Prior Publication Data

US 2012/0316754 A1    Dec. 13, 2012

(51) Int. Cl.
| F02D 41/30 | (2006.01) |
| F02D 28/00 | (2006.01) |
| F02D 41/12 | (2006.01) |
| F02D 41/02 | (2006.01) |
| F01N 13/00 | (2010.01) |
| F02D 41/40 | (2006.01) |
| F01N 3/10 | (2006.01) |
| F01N 3/20 | (2006.01) |

(52) U.S. Cl.
CPC ............ *F02D 41/123* (2013.01); *F02D 41/024* (2013.01); *F02D 41/126* (2013.01); *F02D 41/3029* (2013.01); *F02D 41/3076* (2013.01); *F02D 41/402* (2013.01); *F02D 2200/0802* (2013.01); *Y02T 10/26* (2013.01); *Y02T 10/22* (2013.01); *F01N 3/101* (2013.01); *F01N 3/2066* (2013.01); *F01N 2900/1622* (2013.01); *F01N 13/009* (2013.01)

(58) Field of Classification Search
CPC ............................ F02D 41/123; F02D 41/024
USPC ............ 123/332, 333, 394, 198 D, 675, 676, 123/681, 682, 683, 480, 493, 198 DB; 701/102, 103, 104
See application file for complete search history.

(56) References Cited

U.S. PATENT DOCUMENTS

| 5,732,680 A * | 3/1998 | Ninomiya et al. ............ 123/481 |
| 6,237,561 B1 * | 5/2001 | Takahashi ..................... 123/295 |
| 6,510,685 B2 * | 1/2003 | Bolz et al. ..................... 123/481 |
| 6,829,886 B2 * | 12/2004 | Nakata .......................... 123/481 |
| 7,155,901 B2 * | 1/2007 | Michelini ................... 123/90.15 |
| 7,461,504 B2 * | 12/2008 | Warner et al. .................. 60/295 |
| 7,581,531 B2 * | 9/2009 | Schulz ................... 123/198 DB |
| 7,614,977 B2 * | 11/2009 | Fujii et al. ..................... 477/107 |
| 7,634,907 B2 * | 12/2009 | Colignon ........................ 60/295 |
| 7,640,730 B2 | 1/2010 | Gandhi et al. |
| 7,657,361 B2 * | 2/2010 | Inoue et al. ................... 701/104 |
| 7,958,957 B2 * | 6/2011 | Suzuki et al. ............ 180/65.265 |
| 8,079,212 B2 * | 12/2011 | Matsuoka et al. .............. 60/295 |

(Continued)

FOREIGN PATENT DOCUMENTS

CN          101825009 A      9/2010

*Primary Examiner* — Hieu T Vo
*Assistant Examiner* — Arnold Castro

(57) ABSTRACT

A spark-ignition, direct-injection internal combustion engine is coupled to an exhaust aftertreatment system including a three-way catalytic converter upstream of an NH3-SCR catalyst. A method for operating the engine includes operating the engine in a fuel cutoff mode and coincidentally executing a second fuel injection control scheme upon detecting an engine load that permits operation in the fuel cutoff mode.

16 Claims, 4 Drawing Sheets

(56) References Cited

U.S. PATENT DOCUMENTS

| | | | |
|---|---|---|---|
| 8,381,512 B2* | 2/2013 | Brinkman et al. | 60/285 |
| 8,424,289 B2* | 4/2013 | Narayanaswamy et al. | 60/285 |
| 8,667,953 B2* | 3/2014 | Gallon et al. | 123/321 |
| 8,800,274 B2* | 8/2014 | Sun et al. | 60/301 |
| 2003/0164643 A1* | 9/2003 | Tamura | 303/114.3 |
| 2007/0163242 A1* | 7/2007 | Matsuoka et al. | 60/295 |
| 2007/0213176 A1* | 9/2007 | Fujii et al. | 477/107 |
| 2008/0053071 A1* | 3/2008 | Adams et al. | 60/295 |
| 2009/0149318 A1 | 6/2009 | Gandhi et al. | |
| 2010/0043402 A1* | 2/2010 | Perry et al. | 60/285 |
| 2010/0057325 A1* | 3/2010 | Livshiz et al. | 701/102 |
| 2010/0107605 A1* | 5/2010 | Brinkman et al. | 60/274 |
| 2010/0107606 A1* | 5/2010 | Narayanaswamy et al. | 60/274 |
| 2010/0139251 A1* | 6/2010 | Perry et al. | 60/286 |
| 2010/0186391 A1 | 7/2010 | Najt et al. | |
| 2010/0209321 A1 | 8/2010 | Gandhi et al. | |
| 2010/0239478 A1 | 9/2010 | Arnold et al. | |
| 2010/0263639 A1 | 10/2010 | Uhrich et al. | |
| 2011/0005200 A1 | 1/2011 | Gandhi et al. | |
| 2011/0100013 A1* | 5/2011 | Whitney et al. | 60/706 |
| 2011/0146388 A1* | 6/2011 | Haft et al. | 73/61.43 |
| 2011/0202253 A1* | 8/2011 | Perry et al. | 701/102 |
| 2012/0285143 A1* | 11/2012 | Sun et al. | 60/274 |

* cited by examiner

METHOD FOR OPERATING A SPARK-IGNITION, DIRECT-INJECTION INTERNAL COMBUSTION ENGINE

GOVERNMENT CONTRACT RIGHTS

This invention was made with U.S. Government support under Agreement No. DE-EE0003379 awarded by the U.S. Department of Energy. The U.S. Government may have certain rights in this invention.

TECHNICAL FIELD

This disclosure is related to operating a spark-ignition, direct-injection internal combustion engine and managing its exhaust aftertreatment system.

BACKGROUND

The statements in this section merely provide background information related to the present disclosure. Accordingly, such statements are not intended to constitute an admission of prior art.

Known internal combustion engines configured to operate lean of stoichiometry may be equipped with exhaust aftertreatment systems including three-way catalytic converters and ammonia-selective catalytic reduction (NH3-SCR) catalysts to treat constituents in an exhaust gas feedstream. Such known systems generate and store ammonia on a catalytic surface of the NH3-SCR catalyst to react with exhaust gases. Ammonia may be generated by passing a rich exhaust gas feedstream through a three-way catalytic converter upstream of an NH3-SCR catalyst under specific engine operating conditions. The stored ammonia reduces nitrogen oxide (NOx) molecules in the exhaust gas feedstream to elemental nitrogen and water under a range of operating conditions associated with temperature and flowrate. Stored ammonia may separate from a NH3-SCR catalyst and pass into the exhaust gas feedstream under specific operating conditions. This is referred as ammonia slip.

Known internal combustion engines execute partial or complete fuel cutoff during vehicle deceleration events when an operator torque request is less than a threshold, with or without the engine continuing to rotate. Such operation reduces and changes flow of exhaust gas constituents to an exhaust aftertreatment system, which may cause decreased temperatures and associated reduced conversion efficiency in the exhaust aftertreatment system. During subsequent engine operation, engine control schemes may be required to operate at non-optimum fueling and operating points to increase conversion efficiency.

SUMMARY

A spark-ignition, direct-injection internal combustion engine is coupled to an exhaust aftertreatment system including a three-way catalytic converter upstream of an NH3-SCR catalyst. A method for operating the engine includes operating the engine in a fuel cutoff mode and coincidentally executing a second fuel injection control scheme upon detecting an engine load that permits operation in the fuel cutoff mode.

BRIEF DESCRIPTION OF THE DRAWINGS

One or more embodiments will now be described, by way of example, with reference to the accompanying drawings, in which.

DETAILED DESCRIPTION

Figure 1:
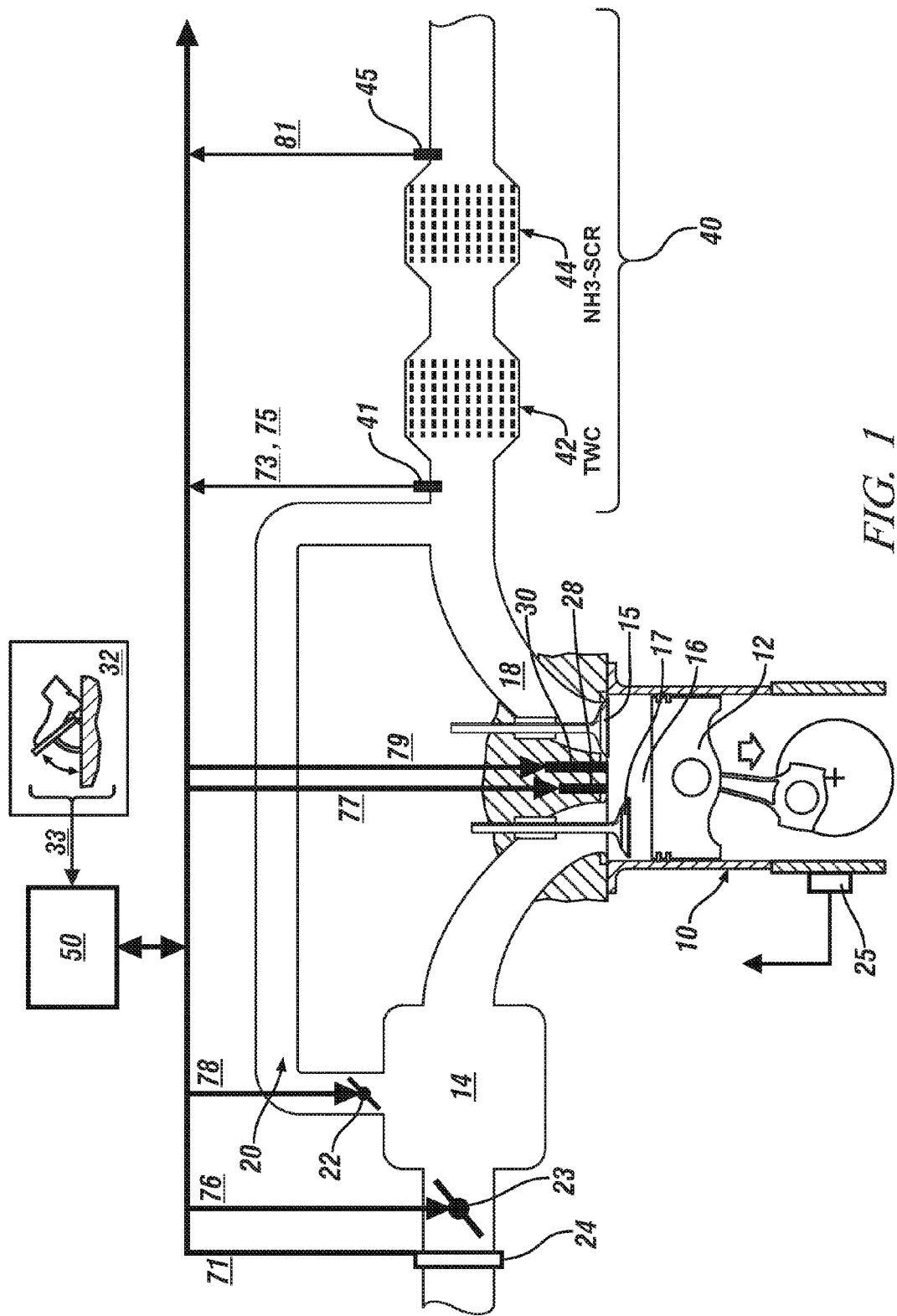
FIG. 1 illustrates a spark-ignition direct injection (SIDI) internal combustion engine fluidly coupled to an exhaust aftertreatment system and signally and operatively connected to a control module in accordance with the disclosure.

Referring now to the drawings, wherein the showings are for the purpose of illustrating certain exemplary embodiments only and not for the purpose of limiting the same, FIG. 1 schematically shows a multi-cylinder spark-ignition direct-injection (SIDI) internal combustion engine 10 fluidly coupled to an exhaust aftertreatment system 40 and signally and operatively connected to a control module 50. The SIDI engine 10 is configured to operate in a four-stroke combustion cycle including repetitively executed intake-compression-ignition-exhaust strokes, or any other combustion cycle. The exhaust aftertreatment system 40 is configured as a passive NH3-SCR system that includes a three-way catalytic converter (TWC) 42 fluidly coupled to and upstream of an ammonia-selective catalytic reduction (NH3-SCR) catalyst 44 in one embodiment.

A single cylinder 12 of the SIDI engine 10 is illustrated. The SIDI engine 10 preferably includes an intake manifold 14, combustion chamber 16, intake and exhaust valves 17 and 15, respectively, an exhaust manifold 18, and an exhaust gas recirculation (EGR) system 20 including an EGR valve 22. The intake manifold 14 preferably includes a mass airflow sensing device 24 that generates a mass airflow signal 71 corresponding to a mass flowrate of engine intake air. The intake manifold 14 optionally includes a throttle device 23 in one embodiment. An air/fuel ratio sensing device 41 is configured to monitor an exhaust gas feedstream of the SIDI engine 10, and preferably generates signal outputs including an air/fuel ratio signal 75 and an exhaust gas feedstream temperature signal 73. A second sensor 45 is configured to monitor the exhaust gas feedstream downstream of the exhaust aftertreatment system 40, and generates an exhaust feedback signal 81 for control and diagnostics.

The SIDI engine 10 is configured to operate in a stratified-charge combustion mode at a lean air/fuel ratio. The SIDI engine 10 is further configured to operate in a homogeneous-charge combustion mode at a lean air/fuel ratio, at a stoichiometric air/fuel ratio, and at a rich air/fuel ratio. Operation of the SIDI engine 10 is in response to engine load, which includes an operator torque request, auxiliary engine loads e.g., hydraulic pumps and low-voltage electric generators, and non-engine loads, e.g., high-voltage electric motor/generators associated with hybrid powertrain systems.

The SIDI engine 10 includes a fuel injector 28 configured to directly inject a fuel pulse into the combustion chamber 16 in the vicinity of a spark plug 30 to generate a cylinder charge in response to a pulsewidth command 77. The spark plug 30 is configured to ignite the cylinder charge in the combustion chamber 16 in response to a spark signal 79. A rotational position sensor 25 is configured to monitor rotational position and speed of a crankshaft of the SIDI engine 10. The description of the SIDI engine 10 is illustrative, and the concepts described herein are not limited thereto. The concepts described herein apply to other internal combustion engines configured to operate lean of stoichiometry fluidly coupled to the exhaust aftertreatment system 40 configured as a passive NH3-SCR system.

The exhaust manifold 18 channels an exhaust gas feedstream to the exhaust aftertreatment system 40. The exhaust aftertreatment system 40 includes the TWC 42 fluidly coupled to and upstream of the NH3-SCR catalyst 44 in one embodiment.

The TWC 42 includes one or more ceramic or metallic substrate elements having a multiplicity of flowthrough passageways that are coated with a washcoat including one or more catalytically active materials. In one embodiment the TWC 42 is coated with catalytically active materials for oxidizing HC and CO molecules and reducing NOx molecules in the exhaust gas feedstream in response to engine operating conditions including air/fuel ratio. In one embodiment the TWC 42 is configured in a close-coupled arrangement relative to the exhaust manifold 18 of the SIDI engine 10.

The NH3-SCR catalyst 44 includes one or more substrate elements preferably fabricated from cordierite material and having a multiplicity of flowthrough passageways that are preferably coated with a zeolite washcoat and catalytic materials including, e.g., a catalytically active base metal. The zeolite washcoat and catalytic materials store ammonia (NH3) under specific operating conditions and release stored NH3 for reacting with NOx molecules in the exhaust gas feedstream under other specific operating conditions. It is appreciated that the NH3 storage capacity of the NH3-SCR catalyst 44, i.e., the amount of NH3 that may be stored on the NH3-SCR catalyst 44 correlates to an inlet temperature of the NH3-SCR catalyst 44. When the inlet temperature increases above a threshold temperature, the NH3 storage capacity decreases.

NH3 may be generated in the TWC 42 by periodically modulating operation of the SIDI engine 10 to generate an exhaust gas feedstream that includes nitrides of oxygen ($NO_x$), carbon monoxide (CO), and hydrogen (H2), to produce NH3 in the TWC 42. Such engine modulation may include engine operating conditions that include a rich air/fuel ratio (AFR) excursion during which the TWC 42 converts rich exhaust gas constituents to CO, H2O, and NH3. In one embodiment, such engine operation may include executing rich fuel pulses to generate NH3 in the TWC 42 that may be stored and used in the NH3-SCR catalyst 44.

Stored NH3 may be used in the NH3-SCR catalyst 44 in accordance with the following chemical equations. In a rich air/fuel ratio environment, the governing chemical equation includes the following.

$$NO_x + H_2/CO \Leftrightarrow NH_3 + CO_2 \quad [1]$$

In a lean air/fuel ratio environment, the governing chemical equation includes using the stored $NH_3$ for lean $NO_x$ conversion as follows.

$$NO_x + NH_3 \Leftrightarrow N_2 + H_2O \quad [2]$$

The control module 50 signally connects an operator interface system 32, the mass airflow sensing device 24, the air/fuel ratio sensor 41, and the exhaust feedback sensor 45, from which it discerns corresponding signals including an operator torque request 33, mass airflow 71, air/fuel ratio 75, exhaust gas feedstream temperature 73, and exhaust feedback 81. The operator interface system 32 monitors operator inputs provided by an accelerator pedal and a brake pedal, and generates one or more signals indicating the operator torque request 33. The control module 50 operatively connects to the fuel injector 28, the spark plug 30, the throttle device 23, and the EGR valve 22. The control module 50 is configured to execute control schemes to control operation of the SIDI engine 10 to form the cylinder charge in response to the operator torque request 33.

The control module 50 operates in a first engine fuel control scheme to control operation of the fuel injector 28 by commanding pulsewidth 77 to deliver a fuel pulse to the combustion chamber 16 in response to the operator torque request 33. The pulsewidth 77 is a time period during which the fuel injector 28 is opened and delivering the fuel pulse. The delivered fuel pulse interacts with intake air and any internally retained and externally recirculated exhaust gases to form a cylinder charge in the combustion chamber 16 in response the operator torque request 33. It is appreciated that the control module 50 may command multiple fuel injection events using corresponding multiple pulsewidths 77 to cause the fuel injector 28 to deliver the fuel pulse to the combustion chamber 16 during each cylinder event.

The control module 50 operates the EGR valve 22 by commanding an EGR valve opening command 78 to cause the EGR valve 22 to operate at a preferred EGR flowrate to achieve a preferred EGR fraction in the cylinder charge. It is appreciated that age, calibration, contamination and other factors may affect operation of the EGR system 20, thus causing variations in in-cylinder air/fuel ratio of the cylinder charge. The control module 50 operates the throttle device 23 by commanding a throttle valve opening command 76 to command a preferred fresh air mass flowrate for the cylinder charge. In one embodiment, the control module 50 operates a turbocharger device to command a preferred boost pressure associated with the cylinder charge.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
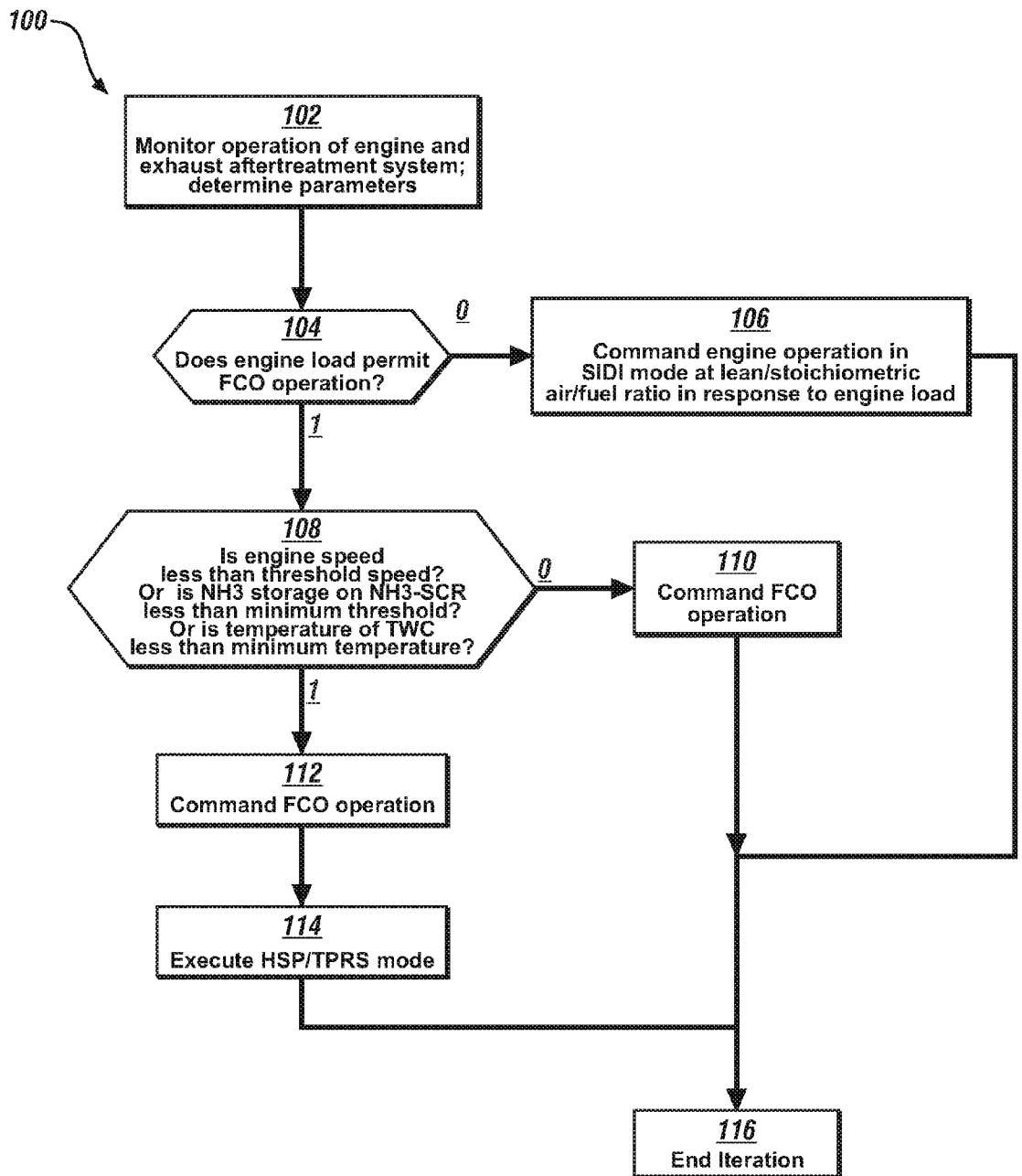
FIG. 2 illustrates an engine control scheme for monitoring and operating an embodiment of the SIDI engine including an exhaust aftertreatment system in accordance with the disclosure.

FIG. 2 schematically shows an embodiment of an engine control scheme 100 for monitoring and operating an embodiment of the SIDI engine 10 including the exhaust aftertreatment system 40 including the TWC 42 and the NH3-SCR 44 described herein. The engine control scheme 100 is described with reference to the SIDI engine 10 of FIG. 1. It is appreciated that the concepts described herein may be applied to other internal combustion engine systems that employ an embodiment of the TWC 42 and the NH3-SCR 44 as part of an exhaust aftertreatment system for treating NOx emissions in an exhaust gas feedstream. The engine control scheme 100 includes monitoring engine load, and upon detecting an engine load that permits operation in a fuel cutoff mode associated with vehicle deceleration, operating the SIDI engine 10 in the fuel cutoff mode and coincidentally executing a second fuel injection control scheme. As described herein, the engine control scheme 100 may be employed to manage temperature(s) in the exhaust aftertreatment system 40, and to generate NH3 in the exhaust gas feedstream for use in the exhaust aftertreatment system 40.

The control scheme 100 is reduced to routines that are iteratively executed, including periodic execution during preset loop cycles, or execution each cylinder event, or other execution cycle. Table 1 is provided as a key wherein the numerically labeled blocks and the corresponding functions are set forth as follows.

TABLE 1

| BLOCK | BLOCK CONTENTS |
|---|---|
| 102 | Monitor operation of engine and exhaust aftertreatment system; Determine parameters associated with engine load, engine speed, NH3 storage, and TWC temperature |
| 104 | Does engine load permit FCO operation? |
| 106 | Command engine operation in SIDI mode at lean/stoichiometric air/fuel ratio in response to engine load |
| 108 | Is engine speed less than threshold speed (stall)? or Is NH3 storage on NH3-SCR less than minimum threshold? or Is temperature of TWC less than minimum temperature (lightoff)? |
| 110 | Command FCO operation |
| 112 | Command FCO operation |
| 114 | Execute HSP/TPRS mode |
| 116 | End Iteration |

During iterations of the control scheme 100, operations of the engine 10 and the exhaust aftertreatment system 40 are monitored to determine parameters associated with engine load, engine speed, NH3 storage on the NH3-SCR catalyst 44, and bed temperature of the TWC 42. These parameters are determined using sensors, routines, calibrations, and parametric models that are known to a person having ordinary skill in the art and are not described in detail herein (102).

It is determined whether the engine load is associated with vehicle deceleration that permits operation in a fuel-cutoff (FCO) mode (104). Operation in the FCO mode may be permitted under conditions when the engine load is substantially zero in one embodiment. The engine load may include the operator torque request 33 as well as the aforementioned auxiliary engine loads and non-engine loads. As is appreciated, operation in the FCO mode may be considered in response to the operator torque request 33 that is indicated by a closed throttle event or no operator input to an accelerator pedal. However, other loads such as the aforementioned auxiliary engine loads and non-engine loads may preclude operation in the FCO mode when there is a closed throttle event or there is minimal operator input to an accelerator pedal. When the engine load does not permit operation in the FCO mode (104)(0), engine operation continues in a selected one of the stratified-charge combustion mode with a lean air/fuel ratio and the homogeneous-charge combustion mode with one of a lean, stoichiometric or rich air/fuel ratio (106), and the present iteration of the control scheme 100 ends (116). This includes engine operation subsequent to operating in the FCO mode as may occur in response to a change in the operator torque request 33 commanding increased engine load to effect vehicle acceleration. Such engine operation includes a selected one of the stratified-charge combustion mode with a lean air/fuel ratio and the homogeneous-charge combustion mode with one of a lean, stoichiometric or rich air/fuel ratio, depending upon the magnitude of the engine load. However, the engine operation subsequent to operating in the FCO mode preferably does not include such operation as is required to thermally heat the TWC 42 to a temperature that is greater than its lightoff temperature. This is due to FCO operation that results in reduced catalyst cooling, as described herein, including at FIG. 5.

When operation in the FCO mode is permitted (104)(1), the monitored parameters associated with engine load, engine speed, NH3 storage on the NH3-SCR catalyst 44, and bed temperature of the TWC 42 are compared to corresponding thresholds. The engine speed is compared to a minimum threshold stall speed. The NH3 storage on the NH3-SCR catalyst 44 is compared to a minimum NH3 storage threshold. The bed temperature of the TWC 42 is compared to a minimum catalyst lightoff temperature threshold (108). It is appreciated that hysteresis values are built into the thresholds for the engine speed, the NH3 storage threshold, and the catalyst lightoff temperature threshold to limit or eliminate dithering about the thresholds. It is appreciated that there may be maximum or saturation thresholds for the engine speed, the NH3 storage on the NH3-SCR catalyst 44, and the bed temperature of the TWC 42 that may preclude operation in the FCO mode or result in implementation of other engine control strategies.

If the engine speed, the NH3 storage on the NH3-SCR catalyst 44, and the bed temperature of the TWC 42 all exceed their corresponding thresholds (0), operation in the FCO mode is commanded (110) and the present iteration of the control scheme 100 ends (116).

If any one of the engine speed, the NH3 storage on the NH3-SCR catalyst 44, and the bed temperature of the TWC 42 is less than the corresponding minimum threshold (1), operation in the FCO mode is commanded (112) in conjunction with executing an ensuing second engine fuel control scheme (114).

Operation in the FCO mode preferably includes discontinuing fuel flow through all of the injectors to the combustion chambers, with the engine only pumping air during each engine rotation. The throttle device may be opened to minimize pumping losses. The engine is preferably coupled via a transmission to a driveline and continues to rotate in response to rotation of the vehicle wheels.

Executing the second engine fuel control scheme in conjunction with operation in the FCO mode (114) preferably includes executing a homogeneous split pulse (HSP) mode fuel injection event that may include executing a two-pulse retarded spark (TPRS) scheme. A TPRS scheme includes executing a first fuel pulse late in a compression stroke or early in an expansion stroke, executing a spark ignition event during the expansion stroke, and executing a second fuel pulse preferably late in the expansion stroke after the spark ignition event. In one embodiment, the first fuel pulse is executed at or near top-dead-center (TDC), the spark ignition event is executed at about 30° aTDC during the expansion stroke, and the second fuel pulse is executed subsequent thereto. The amount of fuel injected during the first and second fuel pulses may be determined in relation to generating a preferred amount of NH3 in the TWC 42 for a particular embodiment of the system and the temperature of the TWC 42.

The fuel injected during the TPRS scheme passes through each combustion chamber 16 substantially uncombusted, with a cylinder charge having a rich air/fuel ratio. A portion of the injected fuel may burn in the combustion chamber 16. A remaining portion of the injected fuel oxidizes in the TWC 42 to generate heat, which increases its operating temperature. The exhaust gas constituents generated by oxidizing the injected fuel on the TWC 42 include CO, H2O, and NH3.

The present iteration of the control scheme 100 subsequently ends (114).

The magnitude of NH3 generated during execution of the control scheme 100 may not be sufficient to meet needs for NH3 during ongoing operation, and thus the control scheme 100 may be used in conjunction with other NH3-generating control schemes.

Figure 3:
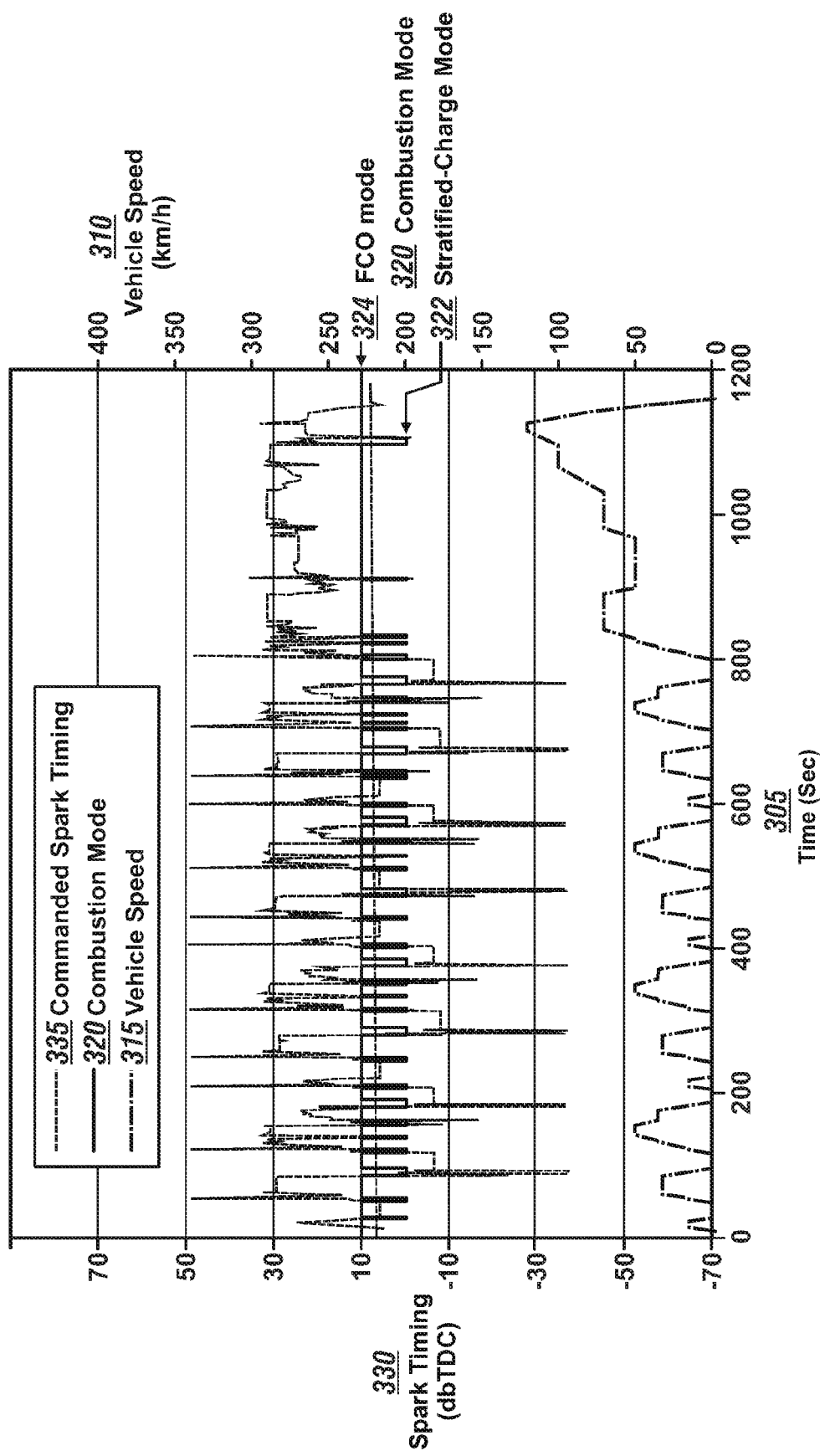
FIGS. 3-5 each illustrates data associated with operating a vehicle equipped with the SIDI engine described with reference to FIG. 1 that is executing an embodiment of the control scheme described with reference to FIG. 2 in accordance with the disclosure.

FIG. 3 graphically shows data associated with operating a vehicle equipped with an embodiment of the SIDI engine 10 described with reference to FIG. 1 that is executing an embodiment of the control scheme 100 described with reference to FIG. 2. The y-axes scales include vehicle speed (km/h) 310, combustion mode 320, and spark timing (dbTDC) 330. The x-axis scale is time (sec.) 305, and shows 1200 sec. of operation. Depicted data include vehicle speed 315, combustion modes including one of a stratified-charge mode 322 and FCO mode 324, and commanded spark timing 335. The data indicate during vehicle deceleration events, the combustion mode switches to the FCO mode 324 with spark timing retarded to between −30 dbTDC and −40 dbTDC, i.e., spark ignition timing occurs after top-dead-center in the FCO mode 324.

Figure 4:
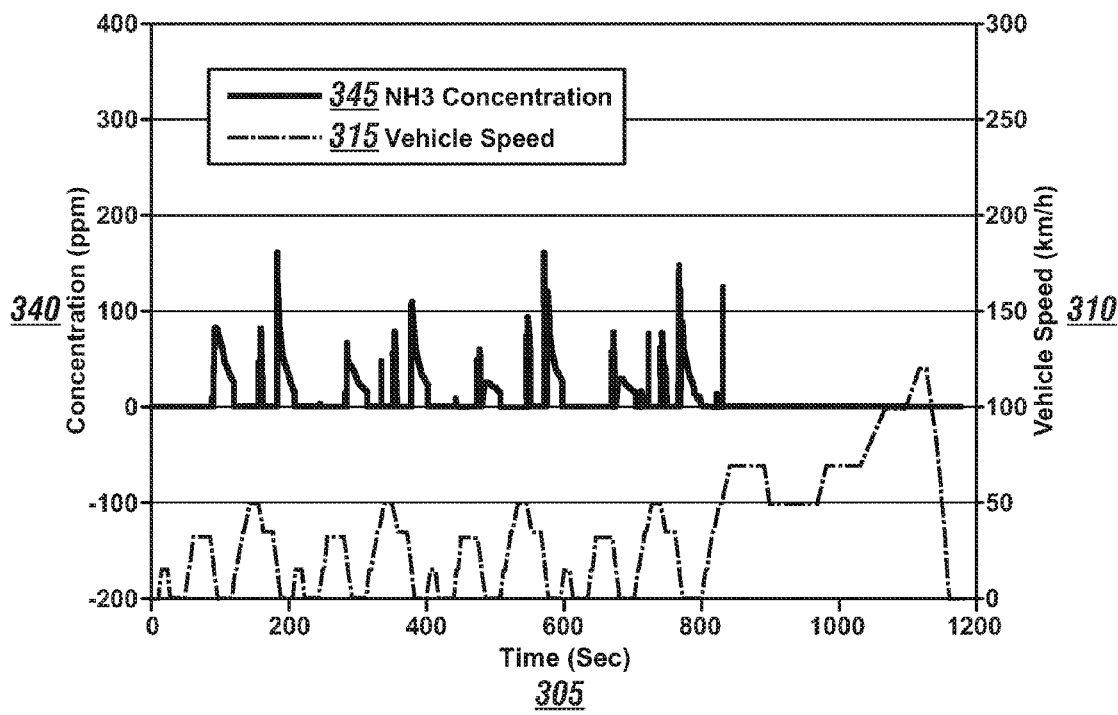

FIG. 4 graphically shows data associated with operating the aforementioned vehicle equipped with the embodiment of the SIDI engine 10 described herein while executing an embodiment of the control scheme 100 described with reference to FIG. 2. The y-axes scales include the vehicle speed (km/h) 310 and NH3 concentration (ppm) 340. The x-axis scale is the time (sec.) 305. The data of FIG. 4 corresponds to the data shown with reference to FIG. 3 over the corresponding 1200 sec. of operation. Depicted data include the vehicle speed 315 and corresponding NH3 concentration 345 during the vehicle operation. As indicated, NH3 is generated in the TWC 42 during vehicle deceleration events.

Figure 5:
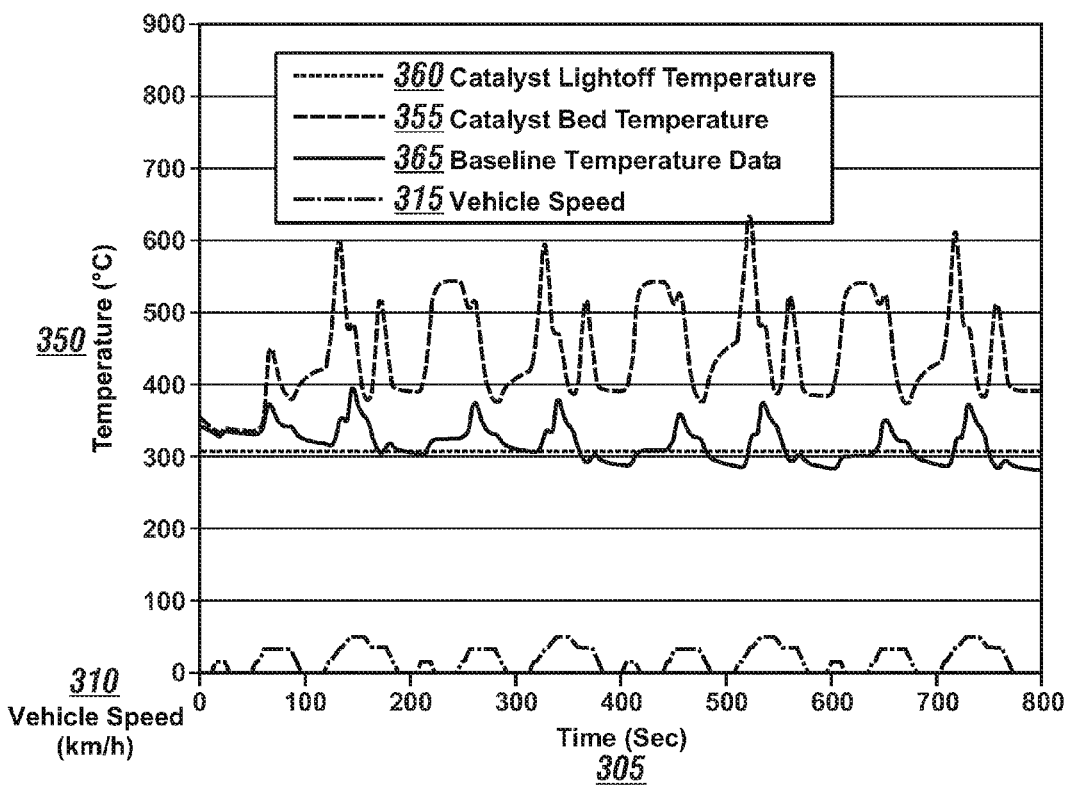

FIG. 5 graphically shows data associated with operating the aforementioned vehicle equipped with the embodiment of the SIDI engine 10 described herein while executing an embodiment of the control scheme 100 described with reference to FIG. 2. The y-axes scales include the vehicle speed (km/h) 310 and temperature (° C.) 350. The x-axis scale is time (sec.) 305, and shows 800 sec. of operation. The data of FIG. 5 corresponds to the initial 800 sec. of operation for the data shown with reference to FIG. 3 over the corresponding times. Depicted data include the vehicle speed 315 and corresponding catalyst bed temperatures measured at 2.5 cm from a front face of the TWC 42. A nominal catalyst lightoff temperature 360 associated with the TWC 42 is depicted, which is about 300° C. The catalyst bed temperature of the TWC 42 during the vehicle operation is shown and includes temperature data 355 corresponding to operation while executing an embodiment of the control scheme 100 described with reference to FIG. 2. By way of comparison, the catalyst bed temperature of the TWC 42 during the vehicle operation is shown and includes baseline data 365 corresponding to operation of a prior art control system, i.e., a control system not executing an embodiment of the control scheme 100 described with reference to FIG. 2. The baseline data 365 indicates that the catalyst bed temperature of the TWC 42 may fall below the catalyst lightoff temperature 360 during deceleration events for a prior art control system. Thus, a prior art control system may have to execute remedial engine control during a subsequent acceleration event to heat the TWC 42 above the lightoff temperature. An exemplary remedial engine control may include operating at stoichiometry during the subsequent acceleration event, which reduces fuel economy and underutilizes the NH3-SCR catalyst 44.

In contrast, the temperature data 355 corresponding to vehicle operation while executing an embodiment of the control scheme 100 is substantially greater than the lightoff temperature 360, and is in a temperature range that is above 360° C. during a substantial portion of the test condition.

The results further indicate that vehicle operation while executing an embodiment of the control scheme 100 which results in the temperature data 355 being substantially greater than the lightoff temperature 360 negates a need to execute an engine control strategy that includes operating at stoichiometry during a subsequent acceleration event. Such operation also facilitates operating at lean air/fuel ratios with more complete utilization of the NH3-SCR catalyst 44.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a spark-ignition, direct-injection internal combustion engine coupled to an exhaust aftertreatment system including a three-way catalytic converter upstream of an NH3-SCR catalyst, comprising:
   upon detecting an engine load that permits operation in a fuel cutoff mode, operating the engine in the fuel cutoff mode and coincidently executing a second fuel injection control scheme;
   wherein detecting the engine load that permits operation in the fuel cutoff mode comprises detecting an operator torque request indicating a deceleration event.

2. The method of claim 1, wherein operating the engine in the fuel cutoff mode and coincidently executing the second fuel injection control scheme comprises operating the engine in the fuel cutoff mode and coincidently executing the second fuel injection control scheme when engine speed is less than a minimum stall speed threshold.

3. The method of claim 1, wherein operating the engine in the fuel cutoff mode and coincidently executing the second fuel injection control scheme comprises operating the engine in the fuel cutoff mode and coincidently executing the second fuel injection control scheme when NH3 storage on the NH3-SCR catalyst is less than a threshold.

4. The method of claim 1, wherein operating the engine in the fuel cutoff mode and coincidently executing the second fuel injection control scheme comprises operating the engine in the fuel cutoff mode and coincidently executing the second fuel injection control scheme when a temperature of the three-way catalytic converter is less than a threshold temperature corresponding to lightoff of the three-way catalytic converter.

5. The method of claim 1, further comprising operating the engine in the fuel cutoff mode and discontinuing executing the second fuel injection control scheme when engine speed is greater than a minimum stall speed threshold, NH3 storage on the NH3-SCR catalyst is greater than a threshold, and a temperature of the three-way catalytic converter is greater than a threshold temperature corresponding to lightoff of the three-way catalytic converter.

6. The method of claim 1, wherein executing the second fuel injection control scheme comprises executing a homogeneous split pulse mode fuel injection event.

7. The method of claim 6, wherein executing the homogeneous split pulse mode fuel injection event comprises executing a two-pulse retarded spark fuel injection event.

8. The method of claim 7, wherein executing the two-pulse retarded spark fuel injection event comprises executing a first fuel pulse early in an expansion stroke, executing a spark ignition event during the expansion stroke, and executing a second fuel pulse late in the expansion stroke after the spark ignition event.

9. Method for operating a spark-ignition, direct-injection internal combustion engine coupled to an exhaust aftertreatment system including a three-way catalytic converter upstream of an NH3-SCR catalyst, comprising:
   upon detecting an engine load that permits operation in a fuel cutoff mode, operating the engine in the fuel cutoff mode and coincidently executing a second fuel injection control scheme; and then
   operating the engine in a stratified charge combustion mode at a lean air/fuel ratio upon detecting a subsequent change in the engine load that precludes operation in the fuel cutoff mode.

10. The method of claim 9, wherein immediately operating the engine in the stratified charge combustion mode at the lean air/fuel ratio upon detecting the subsequent change in the engine load that precludes operation in the fuel cutoff mode comprises operating the engine in the stratified charge combustion mode at the lean air/fuel ratio upon detecting an operator torque request indicating a request for acceleration.

11. The method of claim 9, wherein operating the engine in the fuel cutoff mode and coincidently executing the second fuel injection control scheme comprises operating the engine in the fuel cutoff mode and coincidently executing the second fuel injection control scheme when a temperature of the three-way catalytic converter is less than a threshold temperature associated with lightoff of the three-way catalytic converter.

12. Method to generate ammonia in a three-way catalytic converter fluidly coupled to a spark-ignition, direct-injection internal combustion engine, comprising:
   upon detecting an engine load that permits operation in a fuel cutoff mode, operating the engine in the fuel cutoff mode and coincidently executing a second fuel injection control scheme when a temperature of the three-way catalytic converter is less than a threshold temperature corresponding to lightoff of the three-way catalytic converter.

13. The method of claim 12, wherein executing the second fuel injection control scheme comprises executing a homogeneous split pulse mode fuel injection event.

14. The method of claim 13, wherein executing the homogeneous split pulse mode fuel injection event comprises executing a two-pulse retarded spark fuel injection event.

15. The method of claim 14, wherein executing the two-pulse retarded spark fuel injection event comprises executing a first fuel pulse early in an expansion stroke, executing a spark ignition event during the expansion stroke, and executing a second fuel pulse late in the expansion stroke after the spark ignition event.

16. The method of claim 12, wherein detecting the engine load that permits operation in the fuel cutoff mode comprises detecting an operator torque request indicating a deceleration event

* * * * *